United States Patent
Ichinose et al.

(10) Patent No.: US 6,481,805 B1
(45) Date of Patent: Nov. 19, 2002

(54) BRAKING APPARATUS AND METHOD OF CONTROLLING THE SAME

(75) Inventors: Masanori Ichinose, Tsukuba (JP); Atsushi Yokoyama, Chiyoda (JP); Yuzo Kadomukai, Ishioka (JP); Takaomi Nishigaito, Chiyoda (JP); Hiroyuki Saito, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/531,463

(22) Filed: Mar. 20, 2000

(30) Foreign Application Priority Data

Feb. 28, 2000 (JP) .......................................... 2000-055966

(51) Int. Cl.[7] .............................................. B60T 13/18
(52) U.S. Cl. ........................................ 303/11; 188/72.3
(58) Field of Search ..................... 188/1.11 R, 1.11 W, 188/1.11 L, 1.11 E, 71.8, 158, 156, 162, 72.3; 303/11, 155, 20

(56) References Cited

U.S. PATENT DOCUMENTS

| | | | | |
|---|---|---|---|---|
| 4,327,414 A | * | 4/1982 | Klein | 364/426 |
| 4,944,372 A | * | 7/1990 | Taig | 188/156 |
| 4,995,483 A | * | 2/1991 | Moseley et al. | 188/162 |
| 5,957,246 A | * | 9/1999 | Suzuki | 188/72.1 |
| 6,000,507 A | * | 12/1999 | Bohm et al. | 188/158 |
| 6,008,604 A | * | 12/1999 | Maisch | 318/362 |
| 6,040,665 A | * | 3/2000 | Shirai et al. | 318/14 |
| 6,113,197 A | * | 9/2000 | Kuroki et al. | 303/11 |
| 6,217,131 B1 | * | 4/2001 | Schanzenbach | 303/112 |
| 6,238,011 B1 | * | 5/2001 | Heckmann | 303/20 |
| 6,250,436 B1 | * | 6/2001 | Oikawa et al. | 188/72.1 |
| 6,279,694 B1 | * | 8/2001 | Bohm et al. | 188/162 |

FOREIGN PATENT DOCUMENTS

| | | | |
|---|---|---|---|
| JP | 5147524 | | of 1993 |
| JP | 10203338 | | of 1998 |
| JP | 10-181579 | * | 7/1998 |
| WO | WO 97/12793 | * | 4/1997 |

* cited by examiner

*Primary Examiner*—Jack Lavinder
*Assistant Examiner*—Bradley King
(74) *Attorney, Agent, or Firm*—Antonelli, Terry, Stout & Kraus, LLP (57) ABSTRACT

A braking apparatus comprises a first contact unit arranged on the rotary shaft side of a wheel, at least a second contact unit for contacting the first contact unit for generating a friction force, an actuator for pressing the second contact unit against the first contact unit, and a control unit for controlling the operation of the actuator, wherein the control unit performs the position control operation for moving the second contact unit in such a manner that the interval between the first contact unit and the second contact unit is smaller than a preset distance, and the force control operation for pressing the second contact unit against the first contact unit in accordance with the required braking force.

4 Claims, 6 Drawing Sheets

BRAKING APPARATUS AND METHOD OF CONTROLLING THE SAME

BACKGROUND OF THE INVENTION

The present invention relates to a braking apparatus for braking a rotary unit by bringing a press unit on an actuator into contact, with the rotary unit and a method of controlling the braking apparatus.

A brake fluid pressure control system intended for anti-skid control or traction control is disclosed in JP-A-5-147524, in which the brake cylinder pressure is directly changed by operating a pump and the fluid pressure of the brake cylinder is controlled to a level not directly related to the operating condition of the brake pedal. In such a system, a gear pump is interposed between a brake master cylinder and a brake cylinder, the pump is normally in idle runing not to prevent the supply of the fluid pressure of the master cylinder, so that in the case where the pressure reduction is required as at the time of anti-skid control, the motor of the gear pump is driven to return the brake fluid to the master cylinder, while at the time of pressure increase, the motor is driven reversely to supply the brake fluid to the brake cylinder.

Another braking system comprising a brake pedal and a brake cylinder not directly connected to each other is disclosed in JP-A-10-203338, in which the brake cylinder pressure is changed directly by the operation of a pump. This system comprises a bypass circuit in parallel to the pump for supplying the brake fluid to the brake cylinder from a tank, and the brake fluid pressure is easily controlled by adjusting the opening of a variable orifice arranged midway of the circuit. Specifically, when adjusting the fluid pressure in the brake cylinder, the opening of the variable orifice but not the pump revolution speed or torque is increased thereby to reduce the fluid pressure for a smaller opening degree, thus controlling the fluid pressure upward.

In any one of the conventional systems described above, the pump or the variable orifice is controlled so that the brake fluid pressure coincides with a pressure corresponding to the required braking force.

In the normal braking apparatus utilizing the friction, however, a gap (pad clearance) is provided between a rotary member such as a brake disk and friction members such as brake pads to prevent the dragging of the friction member when the braking force is not required. As long as the brake pads are moving over the distance corresponding to the pad clearance, however, the braking force is not obtained and the vehicle runs free. Therefore, it is necessary to bring the brake pads into contact with the brake disk as early as possible. Also, the braking force is determined by the pressure exerted by the brake pads, i.e. the braking fluid pressure in the brake cylinder in the case of the fluid pressure type. For controlling the braking force, therefore, the fluid pressure is required to be controlled accurately.

According to the brake control system disclosed in JP-A-5-147524, the oil pressure supplied to the brake cylinder is generated directly by the pump, for example, the piston can move freely while the brake pads are moving over the distance corresponding to the pad clearance. Thus, the piston continues to move while generating the pressure due to the sliding resistance and the fluid resistance with the brake cylinder until the brake fluid in an amount corresponding to the pad clearance is completely supplied. From the very instant the brake pads come into contact with the brake disk, however, the piston position is restricted, and the flow rate of the brake fluid, which is. considered a non-compressive liquid, into the brake cylinder is reduced to zero. As a result, the brake fluid pressure increases sharply due to the force of inertia of the pump, the motor and the brake fluid and the delayed fluid pressure control. The degree of this sharp increase in fluid pressure depends on the flow rate, i.e. the motor revolution speed at the moment when the brake pads come into contact with the brake disk, leading to the problem that the higher the motor speed, the shorter the time when the vehicle runs free while the fluid pressure increases more sharply.

In the case where the pressure is controlled by a variable orifice as shown in the other prior art JP-A-10-203338, in contrast, the brake fluid pressure is not increased sharply but the piston travel speed changes with a pressure command value. When a small braking force is required, therefore, the pressure command value is small and the time of free run lengthens correspondingly.

SUMMARY OF THE INVENTION

The object of the present invention is to provide a braking apparatus high in responsiveness with the braking force controllable with high accuracy, and a method of controlling the braking apparatus.

In order to achieve the object described above, according to the present invention, there is provided a braking apparatus comprising a first contact unit arranged on a rotary shaft of a wheel, a second contact unit brought into contact with the first contact unit for generating the friction force, an actuator for pressing the second contact unit against the first contact unit, and a control unit for controlling the operation of the actuator, wherein the control unit performs the position control operation for moving the second contact unit to such an extent that the interval between the first and second contact units is smaller than a preset distance (clearance) and the braking force control operation for controlling the pressure exerted by the second contact unit against the first contact unit.

In the position control operation, the second friction unit is desirably set closer to the first friction unit by an amount corresponding to the preset clearance.

According to this method, the second control unit is set closer to the first contact unit by the position control operation, and the force of pressing the second contact unit against the first contact unit is controlled by the braking force control operation. Thus, the delay time of generation of the braking force is shortened and the accuracy of the braking force control operation is improved at the same time.

DESCRIPTION OF THE EMBODIMENTS

Figure 1:
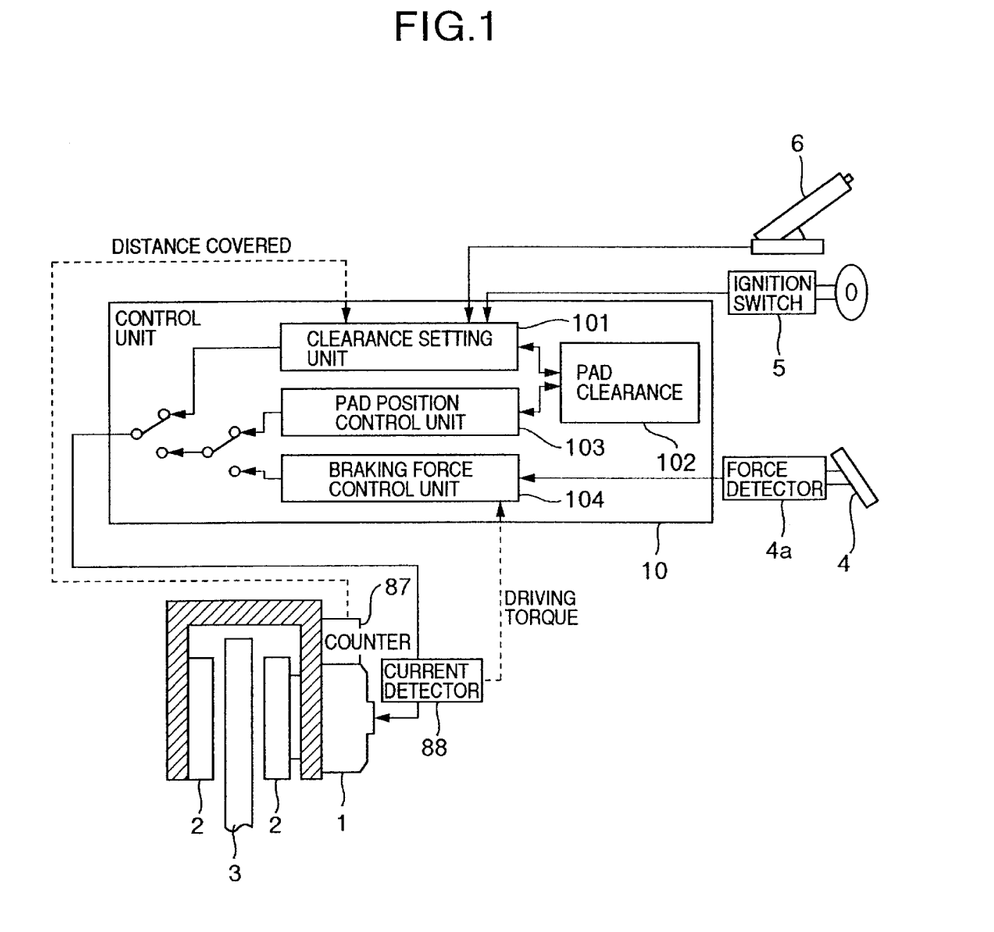
FIG. 1 is a diagram showing a configuration according to a first embodiment of the invention.

FIG. 1 is a diagram showing a configuration according to a first embodiment of the invention. In FIG. 1, a disk brake is schematically shown. Nevertheless, the invention is applicable with equal effect also to other brakes of friction type including a drum brake.

In FIG. 1, numeral 1 designates an actuator for driving contact members (hereinafter referred to as the brake pads) 2 pressed against a contact unit (hereinafter referred to as the brake disk) 3 fixed on the shaft of the wheel. The actuator 1 includes, for example, a linear ball actuator driven by a motor for converting the turning effort of the motor into a reciprocal motion through a ball screw mechanism.

In the aforementioned case, the operation of bringing the brake pads 2 to the vicinity of and pressing them against the brake disk 3 and the operation of returning the brake pads 2 can be performed by forward and reverse rotation of the motor. The braking force is determined by the pressure exerted by the brake pads 2. The braking force, therefore, can be measured by a force sensor or can be determined from the torque of the motor constituting the actuator 1, i.e. the magnitude of the current flowing in the motor.

The position of the brake pads 2, on the other hand, can be determined by counting the number of revolutions of the motor for driving the actuator 1.

According to this embodiment, therefore, a counter 87 for detecting the revolution speed of the motor and a current detector 88 for detecting the current flowing in the motor are used as a means for detecting the relative position of the pads.

The two types of information described above are input to a control unit 10. When the brake pedal 4 is depressed by the driver, for example, the required braking force is determined by the force of depressing the brake pedal 4. The control unit 10 controls the motor of the actuator 1 so that the pad pressure corresponds to the required braking force. For this purpose, the brake pedal 4 includes a force detector 4a for detecting the depression force and converting it to an electrical signal.

According to this embodiment, the brake pads 2 are set to a position with a preset pad clearance when the braking apparatus is initialized. An example of the initialized state of the braking apparatus is the time when the vehicle engine is started or the parking brake is released. To detect this state, an ignition switch 5 or a parking brake switch 6 is connected to the control unit 10.

Figure 2:
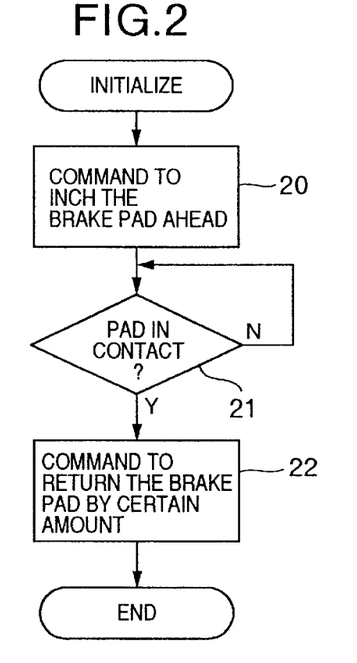
FIG. 2 is a diagram showing the processing flow for initialization of a braking apparatus according to the invention.

Upon determination from these conditions that the braking apparatus is initialized, a pad clearance setting unit 101 sets the pad clearance according to the steps shown in FIG. 2. First, the position at which the brake pads 2 come into contact with the brake disk 3 is determined. In determining this position, as shown in FIG. 2, the brake pads 2 are slowly advanced until the position thereof comes to remain unchanged. This particular position of the brake pads 2 is the one where the brake pads 2 comes into contact.

Once the brake pads 2 come into contact with the brake disk 3, the required torque increases, and therefore the motor drive current value also increases. Thus, the contact between the brake pads 2 and the brake disk 3 can be detected by detecting the change in the current by a current detector 88.

Assume that the pad clearance is set as designated at step 22 in FIG. 2. Specifically, the pad clearance can be set by rotating the motor in reverse direction by an amount corresponding to the pad clearance se by the pad clearance memory 102 in FIG. 1. The pad clearance memory 102 can be any memory device used for storing the pad clearance.

In setting the pad clearance, a mechanic may adjust the position where the brake pads 2 come into contact with the brake disk 3, and from this position, set the brake pads 2 backward by an amount corresponding to a preset clearance. In this way, a superior relation between the origin and the clearance can be maintained. An adjusting mechanism for this purpose can be included in the actuator. In such a case. however, any change which may occur before the actual maintenance time cannot be corrected.

Figure 3:
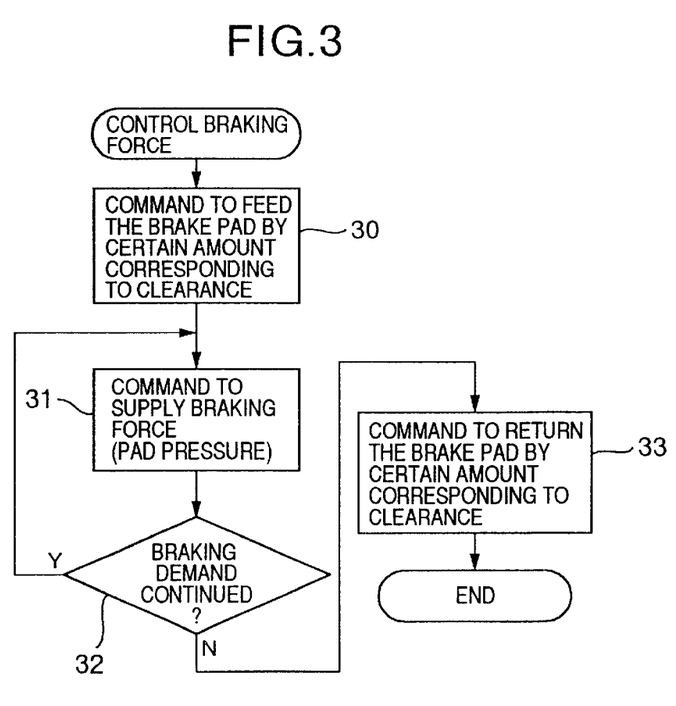
FIG. 3 is a diagram showing the processing flow for the braking operation of a braking apparatus according to the invention.

When the driver starts operating the braking apparatus by depressing the brake pedal 4, for example, the control operation is performed according to the procedure shown in FIG. 3.

At the time of braking operation, the brake pads 2 are brought into contact with the brake disk 3 as designated at step 30 in FIG. 3, and then the motor torque is controlled as designated at steps 31 to 32 in FIG. 3.

This control operation is started with the position control in which the brake pads 2 are set closer to the brake disk 3, followed by the force control in which the brake pads 2 are pressed against the brake disk 3. Thus, the delay time of the braking force generation can be shortened and the accuracy of controlling the braking force can be improved.

Further, when terminating the braking force control upon discontinuation of the braking force demand input, as at step 33 in FIG. 3, the pad clearance is set again as in the initialization. Specifically, a command is issued from the pad position control unit 103 to reverse the motor operation by an amount corresponding to the pad clearance set by the pad clearance memory 102 in FIG. 1 thereby to separate the brake pads 2 from the brake disk 3. The revolution speed for this driving operation is equal to that of the reverse rotation for initialization, and therefore without a sensor or the like for measuring the position of the brake pads, the position at which the brake pads 2 contact the brake disk 3 can be determined.

Once the contact position is determined, even in the case where the brake pads 2 are driven at maximum speed for shortening the free run, distance, the brake pads 2 can be brought into soft contact by reducing the motor driving power immediately before coming into contact. Thus, it is possible to avoid the sharp increase of the contacting force of the brake pads, i.e. the sharp increase of the braking force due to the inertia or the delayed control of the actuator 1.

After that, the command is switched to the braking pressure control unit 104, and the brake pad pressure is controlled until the disappearance of the braking force demand input. Further, when terminating the brake pad pressure control upon disappearance of the raking force demand input, the pad clearance is set gain as at the time of initialization, thereby making it possible to keep a constant clearance of the brake pads 2.

The first embodiment using a linear ball actuator has been described above. Actually, however, the invention is applicable to all types of friction braking apparatus as well as the braking apparatus with pad drive means.

Now, a second embodiment of the invention will be explained.

Figure 4:
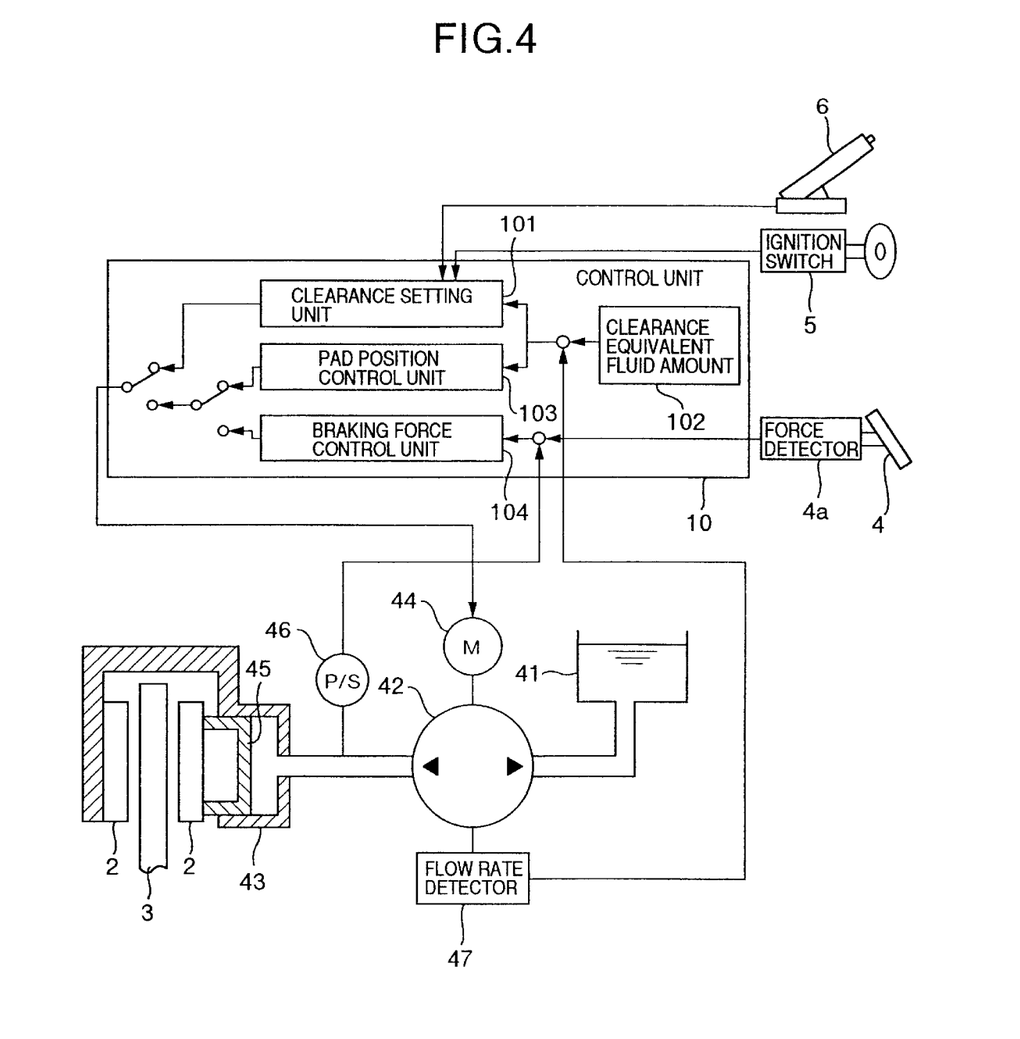
FIG. 4 is a diagram showing a configuration of a second embodiment using a fluid pressure system as driving means for the braking apparatus according to the invention.

FIG. 4 is a diagram showing a configuration of a braking apparatus of fluid pressure type. In FIG. 4, reference numeral 41 designates a reservoir tank for storing the brake fluid. The reservoir tank 41 is connected to a brake cylinder 43 through a reversible pump 42. The pump 42 is driven by a motor 44. The motor 44 driven in forward or reverse direction permits the pressuring operation in which the brake fluid is supplied from the reservoir tank 41 to the brake cylinder 43 and the pressure reducing operation in which the brake fluid is returned from the brake cylinder 43 to the reservoir tank 41.

In the pressuring operation, the piston 45 is pushed out under the pressure of the brake fluid supplied by the pump 42, and the braking force is generated as the brake pads 2 are pressed against the brake disk 3. The braking force thus generated is determined by the brake fluid pressure, and is controlled by controlling the brake fluid pressure. The brake fluid pressure can be determined also from the torque of the motor 44 for driving the pump 42, i.e. the magnitude of the current supplied to the motor 44. As shown in FIG. 4, a pressure sensor 46 can be used alternatively. By the way, the distance covered by the brake pads 2 can be determined from the brake fluid flow rate detector 47.

The aforementioned two types of information are input to the control unit 10. When the driver depresses the brake pedal 4 under this condition, the required braking force is determined by the force of depression of the brake pedal 4. The control unit 10 controls the motor 44 to secure a brake fluid pressure corresponding to this required braking force.

According to this embodiment, the brake pad position is set with a predetermined pad clearance like in the first embodiment described above at the time of initializing the braking apparatus in the same procedure as in FIG. 2. As a method of determining the position where the brake pads 2 come into contact with the brake disk 3, the pump 42 is driven slowly to advance the brake pads 2 slowly, and the position of the brake pads 2 at the instant when the internal pressure of the brake cylinder 43 rises is determined as the position where the brake pads 2 and the brake disk 3 come into contact with each other. Thus, the position where the brake pads 2 and the brake disk 3 come into contact with each other can be detected either by the pressure sensor 46 or by detecting the drive current value of the motor 44.

In setting the pad clearance, the pump 42 is driven in reverse direction by the fluid amount determined by the pad clearance based on the information of the flow rate detector 47 in FIG. 4, and the brake fluid in the brake cylinder 43 is returned to the reservoir tank 41.

The next starting operation of the braking apparatus is controlled in the same-manner as in FIG. 3 described above. Specifically, first, the pump 42 is driven in response to a command from the pad position control unit 103 in such a manner as to supply the brake cylinder 43 with a fluid amount corresponding to the pad clearance set by the memory 102 in FIG. 1 based on the information of the flow rate detector 47 in FIG. 4, and thus the brake pads 2 are brought into contact with the brake disk 3. The fluid amount corresponding to the pad clearance is equal tot he brake fluid amount returned to the reservoir tank 41 at the time of initialization. For this reason, the position where the brake pads 2 come into contact with the brake disk 3 can be determined without any sensor for measuring the position of the brake pads 2. Once the position of contact is known, the brake pads 2 can be brought into contact softly by weakening the driving force of the pump 42 immediately before contact in the same manner as in the first embodiment. Thus, the sharp increase in the brake fluid pressure can be avoided which otherwise might be caused by the inertia or the delayed control of the motor 44, the pump 42 and the brake fluid.

Figure 5:
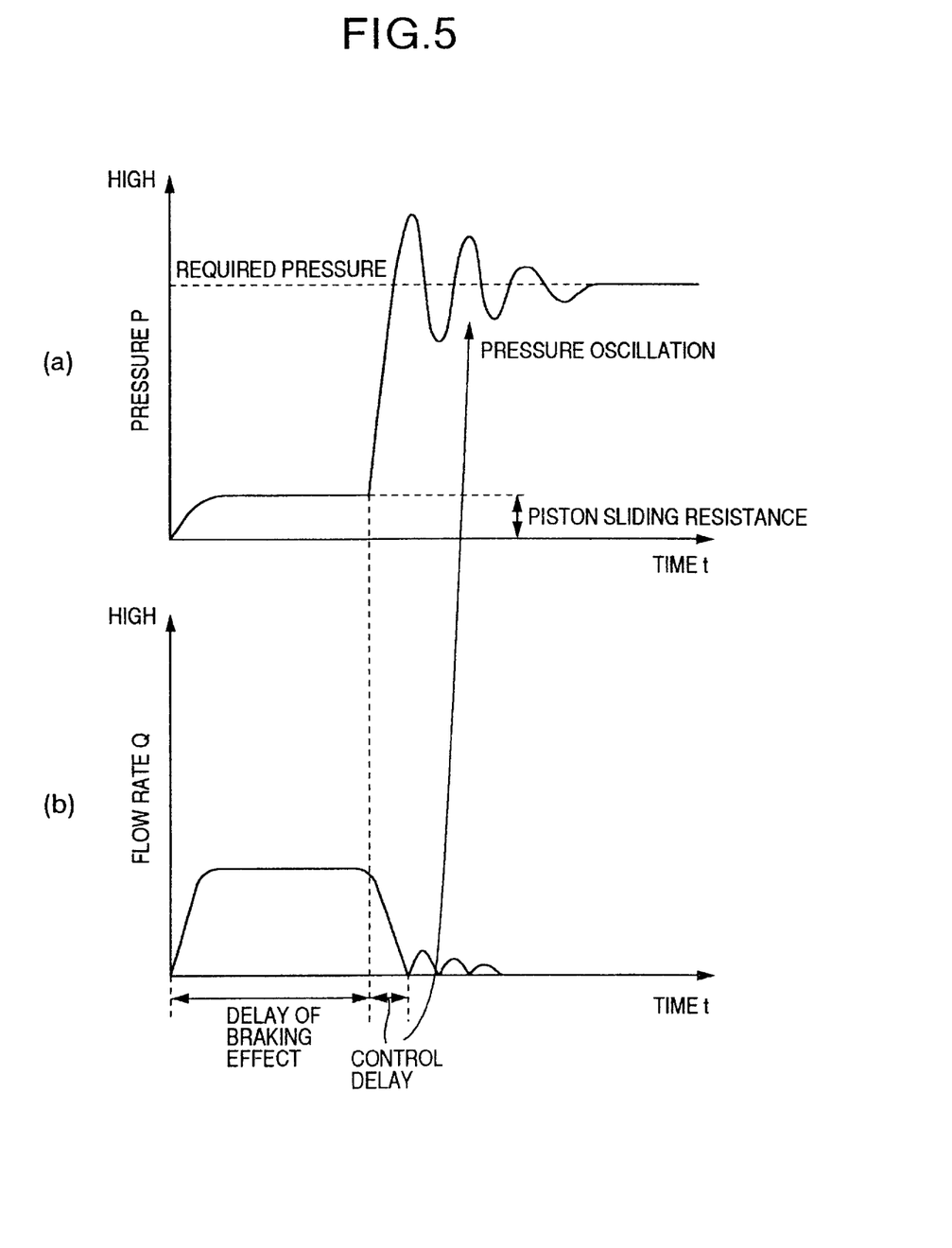
FIG. 5 is a schematic diagram showing a chronological change of the pump flow rate and the brake cylinder fluid pressure in the case where only the fluid pressure is controlled in response to a braking command.

FIG. 5 shows the relation between the brake cylinder fluid pressure P(a) and the pump flow rate Q(b) with time in the conventional braking apparatus, and indicates the increased free-run time due to the shortage of the flow rate before contact between the brake pads 2 and the brake disk 3, and also the sharp increase in fluid pressure due to the delayed fluid pressure control.

Figure 6:
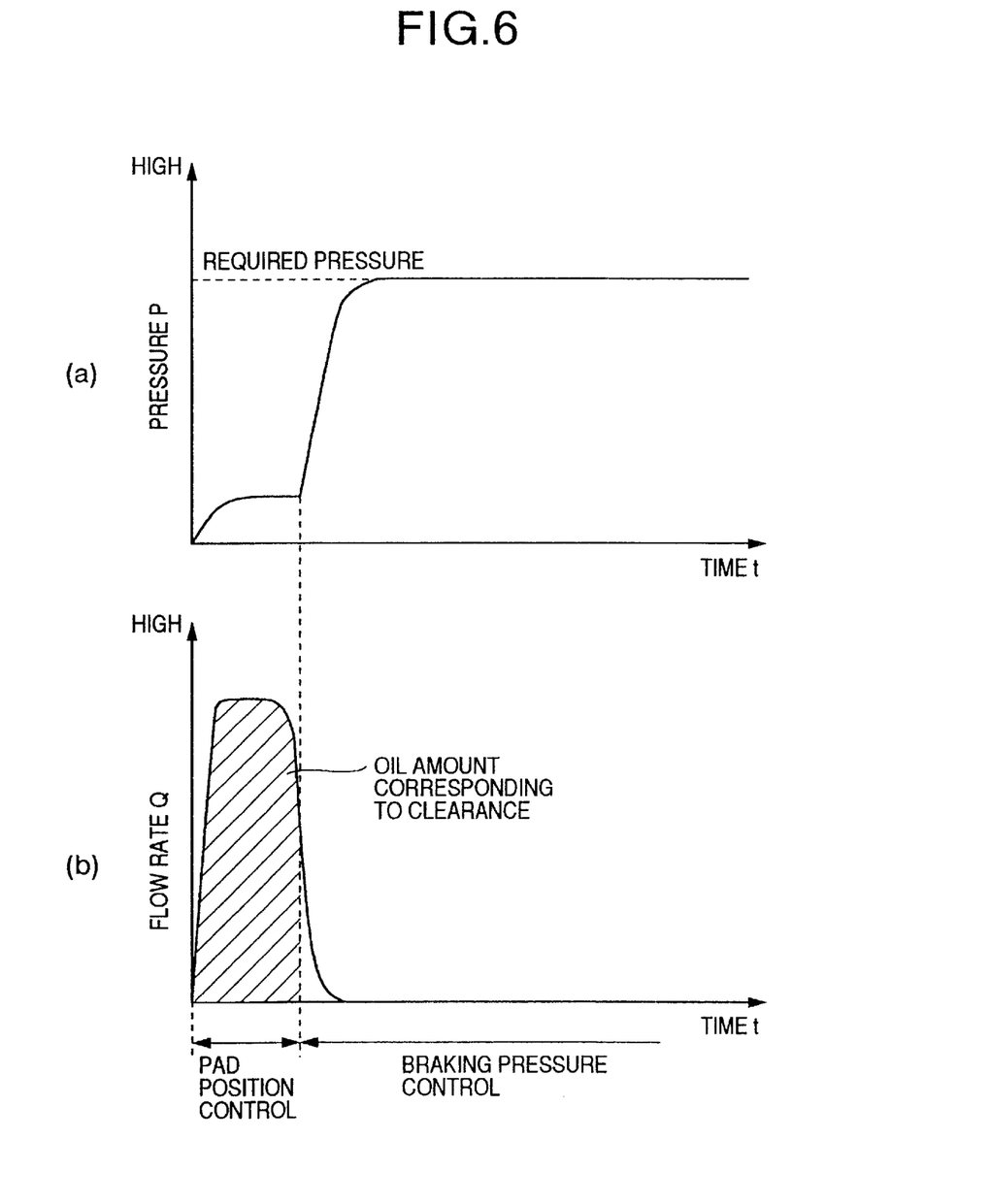
FIG. 6 is a schematic diagram showing a chronological change of the pump flow rate and the brake cylinder fluid pressure in the case where the braking control operation is performed according to the invention.

FIG. 6 is a schematic diagram showing the relation between the brake fluid pressure P(a) and the pump flow rate Q(b) with time in the brake control operation according to the present embodiment. As compared with FIG. 5, the free-run time is shortened while at the same time stabilizing the fluid pressure. Subsequently, the command is switched to the braking pressure control unit 104 and the brake fluid pressure continues to be controlled until the disappearance of the input braking force demand. Further, at the end of the brake fluid pressure control upon the disappearance of the braking force demand, the pad clearance is set again as at the time of initialization, so that an always constant clearance of the brake pads 2 is maintained.

In the fluid pressure system described above, the amount of the brake fluid moved by the pump 42 can be determined by counting the number of revolutions of the pump shaft or the motor shaft when driving the pump. Specifically, since the displacement per pump revolution is known, the brake fluid amount can be calculated as the product of the pump revolution speed and the displacement. Thus, the flow rate detector 47 shown in FIG. 4 is configured with a revolution speed detector for measuring the revolution speed of the motor 44. The revolution speed corresponding to the clearance can specified by dividing the volume corresponding to the pad clearance by the pump displacement. Thus, using the revolution speed as a command value from the memory 102, the output of the revolution speed detector (flow rate detector) 47 can be controlled by comparing it with the command value from the memory 102. For detecting the revolution speed of the motor 44, an encoder is mounted on the shaft to count the revolution speed directly, or the revolution speed can be counted from the number of pulsations of the driving current value.

Now, a third embodiment of the invention will be explained.

Figure 7:
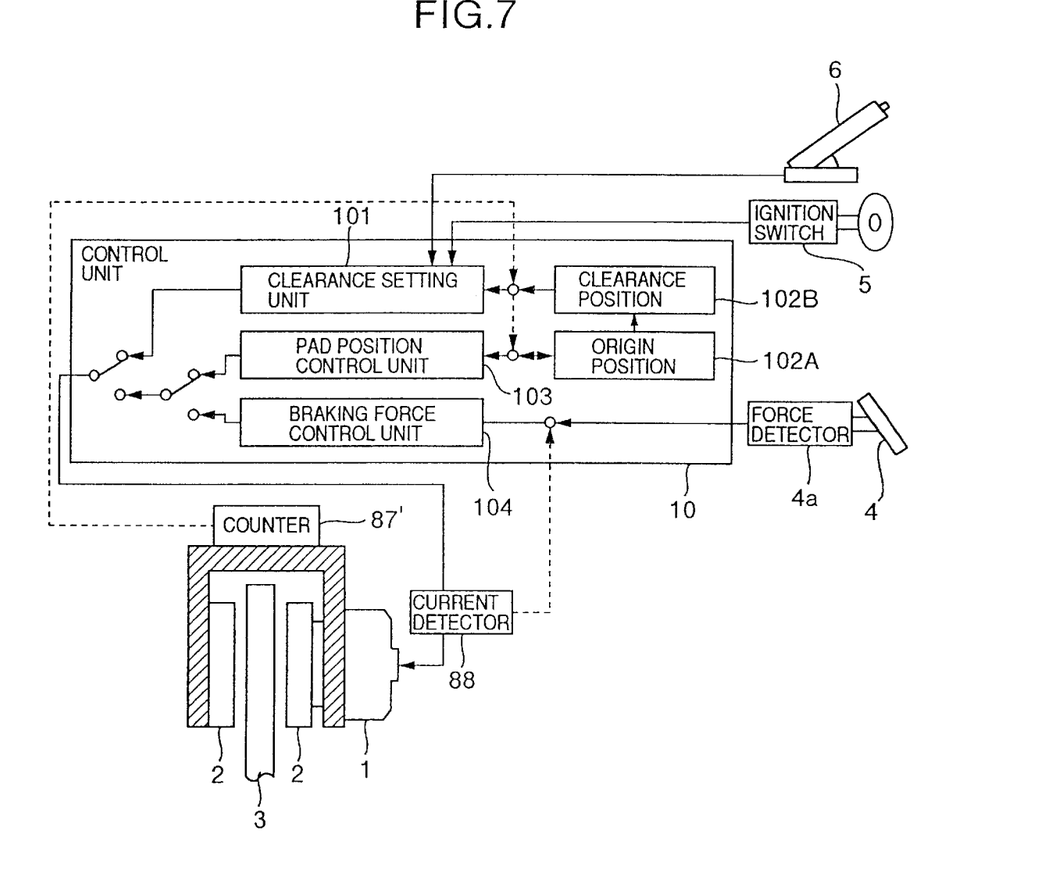
FIG. 7 is a diagram showing a configuration of a third embodiment using a pad position sensor as pad position detection means according to the invention.

FIG. 7 is a diagram showing a configuration comprising a counter 87' serving as a pad position sensor for measuring the position of the brake pads 2, which is capable of measuring, either directly or indirectly, the position where the brake pads 2 come into contact with the brake disk 3. With the counter (pad position sensor) 87', the position where the brake pads 2 come into contact with the brake disk 3 is stored as an origin position memory 102A, and the pad position with a specified pad clearance is stored in the clearance position memory 102B. At the time of initialization or at the end of the braking operation, the pad clearance setting unit 101 compares the output of the counter (pad position sensor) 87' with the clearance position stored in the memory 102B, while when the brake pads 2 are brought into contact with the brake disk 3 at the time of starting the braking operation, the pad position control unit 103 compares the output of the counter (pad position sensor) 87' with the original position stored in the memory 102A for the purpose of control.

Also, this embodiment, unlike the second embodiment relating to the brake of fluid pressure type in which each wheel has an independent pump, is applicable to a braking apparatus in which a fluid pressure source is configured with a single pump and the fluid pressure is supplied to a plurality of wheels by valve control. In such a case, the pad clearance for each wheel is secured by a clearance mechanism built in each pad driving unit like in the normal braking apparatus. Thus, the clearance setting unit 101 measures the pad clearance of each wheel without controlling the clearance amount positively, and stores the clearance position in the memory 102B. When the brake pads 2 are brought into contact with the brake disk 3 at the time of starting the braking operation, the pad position control unit 103 compares the output of the counter (pad position sensor) 87' with the origin in the memory 102A, so that the brake pads 2 are advanced by controlling the valve for supplying the brake fluid pressure for each wheel.

The embodiments described above concern an example of a series of operation performed upon receipt of a braking force demand. In the case where the braking operation by the driver is predicted upon detection of the following distance or an obstacle position by means of a radar or the like, the clearance is closed by operating the pad position control unit 103 in advance in order to quickly respond to the braking demand of the driver, and when the braking demand is received, the pressuring operation is started immediately by the braking pressure control unit 104.

The control unit 10 included in each of the embodiments described above can be realized with a well-known microcomputer system. The microcomputer system (not shown) includes a memory unit for storing a data table or a brake control program described with reference to the flowchart of FIGS. 2, 3, an input/output port for inputting/outputting a signal, a RAM for temporarily storing the processed data, a CPU and a bus line connecting them. The memory unite for storing the control program is a semiconductor memory for example. An optical disk unit or a magnetic memory unit can also be used in place of the semiconductor memory as far as they can record computer readable program codes.

The features of the respective embodiments can be summarized as follows.

(1) The braking apparatus comprises a pad clearance setting unit for maintaining a preset clearance of the brake pads at the time of initialization and at the end of the braking operation, a pad position control unit for moving the brake pads of the braking apparatus to a position in contact with the brake rotor when starting the braking operation, and a braking force control unit for controlling the force of pressing the brake pads, wherein the brake pad position is controlled so that a specified pad clearance is secured in response to a command from the pad clearing setting unit at the time of brake initialization. When performing the braking operation, on the other hand, the brake pads are advanced by an amount corresponding to the pads clearance in response to a command from the pad position control unit into contact with the brake rotor, followed by switching the command to the braking force control unit so that the brake pad pressure is controlled in response to a braking force command value.

(2) In (1) above, assuming that the driving unit of fluid pressure type is used for the braking apparatus, the pad clearance setting unit specifies the volume of the brake fluid corresponding to the pad clearance returned to the brake fluid source from the pad driving unit with reference to the state where the brake pads are in contact with the brake rotor thereby to maintain a constant pad clearance, while the pad position control unit supplies the brake fluid of the volume corresponding to the pad clearance to the pad driving means.

(3) In (2) above, the pad clearance setting unit and the pad position control unit use as a command value the revolution speed of the motor for driving the pump in order to specify the volume corresponding to the pad clearance.

(4) In (2) above, the pump driving torque generated in response to a command from the pad position control unit is larger than the pump driving torque generated in response to a command from the braking force control unit based on the braking force command value.

(5) In (1) or (2) above, the pad driving unit includes a pad position sensor, and the pad clearance setting unit turns back the pad position by an amount corresponding to a specified clearance based on the output of the pad position sensor with reference to an origin constituted of the position where the brake pads are in contact with the brake rotor thereby to maintain a predetermined pad clearance. The pad position control unit, on the other hand, restores the pad position to the origin based on the output of the pad position sensor.

In (1) above, a predetermined value of the pad clearance is set for initialization of the braking apparatus and termination of braking operation, while the brake pads are advanced by a distance corresponding to the pad clearance into contact with the brake rotor at the time of starting the braking operation. This advance of the brake pads is equal to the backward movement of the brake pads for setting the pad clearance at the time of initialization. As a result, the position at which the brake pads come into contact with the brake rotor can be determined without any sensor for measuring the brake pad position. Once the contacting position is determined, the motor driving power can be reduced immediately before the contact to softly seating the brake pads even when the brake pads are driven at maximum speed in order to shorten the free-run distance. Thus, it is possible to avoid the sharp increase in the contacting force of the brake pads, i.e. the sharp increase in the braking force due to the inertia or the delayed control of the actuator.

In (2) above, on the other hand, as in (1), the pump driving force is reduced immediately before the brake pads come into contact with the brake rotor thereby to softly seat the brake pads. In this case, too, the sharp rise in the brake fluid pressure, i.e. the sharp rise in the braking force can be avoided.

In (3) above, the pump revolution speed corresponding to the clearance in the fluid pressure type of the braking apparatus is used as a command value, and the pump revolution speed is compared with the command value, thereby making it possible, to stabilize the brake fluid pressure with a simple structure.

In (4) above, the pump driving torque for bringing the brake pads into contact with the brake rotor at the time of starting the braking operation is set higher than the pump driving torque at the time of pressure control, thereby making it possible to shorten the vehicle free-run distance before the brake begins to work.

In (5) above, the provision of a pad position sensor leads to the effect of managing the position where the brake pads come into contact with the brake rotor for high responsiveness and stabilization of the braking force.

As described above, the high responsiveness and stabilization of the braking force prevents the spin and drift of the vehicle and stabilizes the vehicle behavior and motion. Also, in the automatic braking operation using an advanced cruise control unit for measuring and maintaining a constant distance with the vehicle running ahead or an obstacle lying ahead, the braking force can be generated smoothly and quickly. Also, in the advanced cruise control unit for measuring the spacing or headway to a preceding vehicle or an obstacle, a pad clearance is closed in advance in the case where the braking operation by the driver can be predicted, thus making it possible to respond quickly to the driver's demand for braking.

It will thus be understood from the foregoing description that according to this invention, the delay time of braking force generation can be shortened and the accuracy of the braking control can be improved by controlling the braking position and the braking force.

What is claimed is:

1. A braking apparatus comprising:

a first contact unit including a brake rotor arranged on a rotary shaft side of a wheel;

a second contact unit including at least a brake pad;

an actuator arranged to press the second contact unit against the first contact unit;

a control unit for controlling the operation of the actuator and performing a position control operation for moving the second contact unit in such a manner that an interval between the first contact unit and the second contact unit is smaller than a preset clearance, and a force control operation for pressing the second contact unit against the first contact unit in accordance with a required braking force, said control unit comprising a pad clearance setting unit for maintaining a preset clearance between the brake pad and the brake rotor; a pad position control unit for moving the brake pad to a position substantially in contact with the brake rotor; a brake force control unit for controlling the pressure to press the brake pad against the brake rotor; and a switching unit for switching between the brake force control unit, the pad position control unit and the pad clearance setting unit;

a brake fluid source for supplying the brake fluid, a brake pad driving unit for driving the brake pad under the pressure of said brake fluid, and a pump for supplying the brake fluid to said brake pad driving unit or reducing the pressure of the brake fluid of said brake pad driving unit midway of the fluid path connecting said brake fluid source and said brake pad driving unit, wherein said pad clearance setting unit maintains the preset clearance between the brake pad and the brake rotor by specifying a volume of the brake fluid corresponding to the pad clearance to be returned to the brake fluid source from said brake pad driving unit based on the state in which the brake pad is in contact with the brake rotor, and wherein said pad position control unit supplies the volume of the brake fluid corresponding to the pad clearance to said brake pad driving unit.

2. A braking apparatus according to claim 1, wherein said pad clearance setting unit and said pad position control unit utilize a revolution speed of a motor for driving the pump as a command value to specify the volume of the brake fluid corresponding to the pad clearance.

3. A braking apparatus according to claim 1, wherein a driving torque of the pump generated in response to a command of said pad position control unit is larger than the driving torque of the pump generated in response to a command of said braking force control unit based on a braking force command value.

4. A braking apparatus according to claim 1, wherein said control unit contains a computer program written to perform the functionality of the pad clearance setting unit, the pad position control unit, the braking force control unit, and the switching unit.

* * * * *